United States Patent [19]

Hutson

[11] Patent Number: 4,649,706

[45] Date of Patent: Mar. 17, 1987

[54] HYDRAULIC FEED CONTROL SYSTEM FOR LOG DEBARKERS

[76] Inventor: James H. Hutson, Rte. 4, Box 925, Pell City, Ala. 35125

[21] Appl. No.: 731,033

[22] Filed: May 6, 1985

Related U.S. Application Data

[63] Continuation-in-part of Ser. No. 430,794, Sep. 30, 1982, Pat. No. 4,522,242, and Ser. No. 527,814, Aug. 30, 1983, Pat. No. 4,585,042.

[51] Int. Cl.⁴ .............................................. F16D 31/02

[52] U.S. Cl. ........................................ 60/420; 60/424; 91/520; 91/532; 144/208 E

[58] Field of Search .............. 144/208 E; 91/514, 515, 91/520, 517, 518, 532, 450, 451, 452; 60/420, 422, 424; 198/624, 788, 789, 791

[56] References Cited

U.S. PATENT DOCUMENTS

| | | | |
|---|---|---|---|
| 2,780,204 | 2/1957 | Barley | 91/451 X |
| 2,857,945 | 10/1958 | Brundell et al. . | |
| 3,435,616 | 4/1969 | Waldorff | 60/424 |
| 3,478,514 | 11/1969 | Parker | 60/424 X |
| 3,490,665 | 1/1970 | Jonsson | 144/208 E X |
| 3,625,115 | 12/1971 | Tani et al. | 91/515 X |
| 3,774,660 | 11/1973 | Morey et al. . | |
| 3,926,210 | 12/1975 | Rasmussen | 91/451 X |
| 3,994,327 | 11/1976 | Bergholm et al. | 198/624 X |
| 4,257,461 | 3/1981 | Wangeby et al. | 198/624 X |

FOREIGN PATENT DOCUMENTS

| | | | |
|---|---|---|---|
| 1802 | 1/1982 | Japan | 91/451 |

*Primary Examiner*—Edward K. Look

*Attorney, Agent, or Firm*—Lalos, Keegan & Kaye

[57] ABSTRACT

A hydraulic feed control system for log debarkers having three infeed and three outfeed rolls. Each roll is driven by its own hydraulic motor. Each infeedmotor is connected in series with a corresponding outfeed motor whereby three pairs of motors are defined. The hydraulic fluid is pumped through a three way flow divider which divides the fluid equally to each of these pairs. Each of the motors has a special crossover relief with a directional flow control that will prevent the excessive pressure that may be created by one of the motors in the series from effecting the pressure to the other motors. The special relief is also provided with a direct line into the oil reservoir which if needed either of the motors in series may siphon oil from the reservoir through the directional flow control valve without affecting the other motor. The return line from the outfeed (down flow) motor joins a common return which is separate from the relief return to tank. When any of the motors for any reason is inadequately supplied with oil, the motor will act as a pump siphoning fluid from the tank. Additionally, any excess fluid flowing to a motor will drain through the relief system back to the tank. This system is also supplied with a separate return to reservoir.

10 Claims, 2 Drawing Figures

HYDRAULIC FEED CONTROL SYSTEM FOR LOG DEBARKERS

BACKGROUND OF THE INVENTION

The present application is a continuation-in-part of application Ser. No. 430,794, filed Sept. 30, 1982, now U.S. Pat. No. 4,522,242, entitled "Hydraulic Fed Log Debarker", and of application Ser. No. 527,814, filed Aug. 30, 1983, now U.S. Pat. No. 4,585,042, entitled "Log Debarker", the contents of both of which are hereby incorporated by reference in their entirety.

To accommodate the dramatic changes in the logging industry wherein a wider variety of quality and types of logs must be debarked in a total tree harvesting method, a new generation of debarkers has been designed, as described in the above-noted applications. Many of the logs which are now to be debarked are generally of lower quality having greater numbers of sweeps, knots, swelled butts and kinorshums, and of varying lengths and sizes. In the past, a debarker design, as shown for example in U.S. Pat. No. 2,857,945, was used and the spiked feed rolls for feeding the log through the rotating debarking tools of the debarker were mechanically linked and driven so that they would all rotate at the same rate. Thus, when one roll encountered a distortion in the log and was forced to rotate at a different speed than the other rolls, the driving ring gears and pinions would break. This resulted in the log debarker having considerable down time as well as great part replacement and repair expenses. Thus, a new generation of log debarkers as designed by the present inventor has evolved. These are hydraulically driven debarkers and each of the feed rolls has its individual driving means and a sensing means to adjust the individual rate of rotation of each of the rolls to accommodate the uneven log surfaces.

The hydraulic systems of these debarkers have proven to be very successful. However, sometimes sufficient instant power was not available for the hydraulic motors and difficulties were sometimes encountered in feeding a large log smoothly through the debarker. Also, under certain conditions the known systems were sometimes not able to efficiently handle all ranges of feed speeds especially the lower speeds.

Shock loading to log debarkers is caused by any sudden changes in the force required by any one of the hydraulic feeding motors such as when the log strikes the infeed rollers, the debarking tools or the outfeed rollers as might be caused by knots, sweeps, or crooks as when the barking tools drop off the end of a log. It was further desired to have a hydraulic system which could better handle the numerous problems of shock loading encountered with bad logs.

OBJECTS OF THE INVENTION

Accordingly, it is the principal object of the present invention to provide a novel design for a log debarker.

Another object of the present invention is to provide a novel design for a hydraulic driving system for log debarkers.

A further object of the present invention is to provide an improved hydraulic driving system which can provide sufficient and greater instant power to each of the feed rolls.

A still further object is to provide a novel hydraulic drive system which can handle any range of speeds especially including the lower speeds.

Another object is to provide a novel hydraulic system which insures that all of the hydraulic motors always have a sufficient supply of oil to prevent cavitation.

A further object is to provide an improved hydraulic drive system which can better handle the problems of shock loading encountered with bad logs.

A still further object is to provide a novel design for hydraulic log debarker drive systems which can be easily assembled on the hydraulic motors.

Another object is to provide an improved hyraulic driving system for log debarkers which has sufficient torque to smoothly feed large logs.

Other objects and advantages of the present invention will become more apparent to those persons having ordinary skill in the art to which the present invention pertains from the foregoing description taken in conjunction with the accompanying drawing.

THE DRAWINGS

DESCRIPTION OF THE INVENTION

Figure 1:
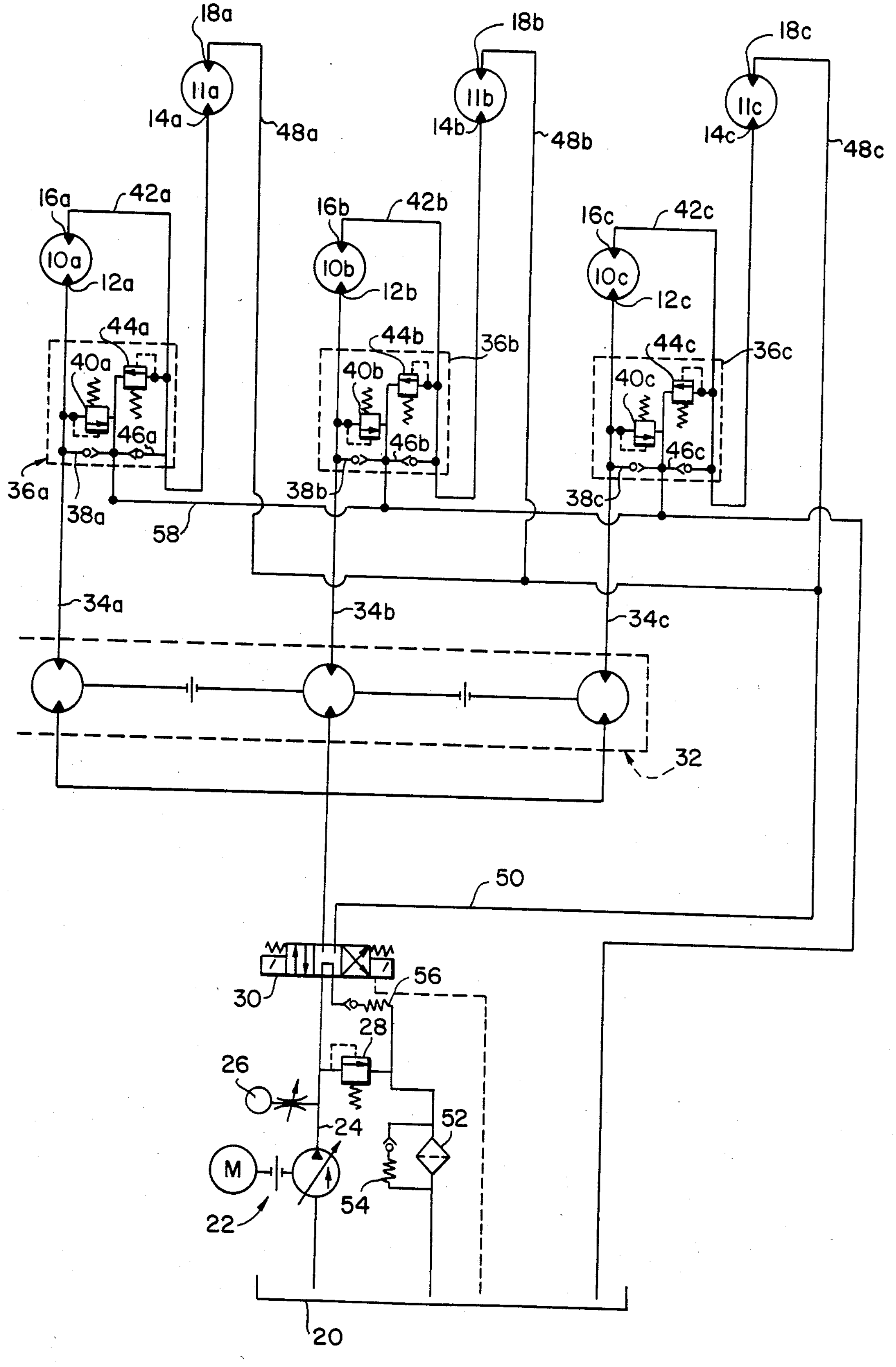
FIG. 1 is a schematic view of a hydraulic drive circuit for a log debarker of the preferred embodiment of the present invention.

FIG. 1 illustrates the hydraulic drive circuit of the present invention. Referring thereto, it is shown that six hydraulic motors *10a*, *10b*, *10c*, *11a*, *11b*, and *11c* are provided. Each has an upstream port *12a*, *12b*, *12c*, *14a*, *14b*, and *14c*, respectively, and a downstream port *16a*, *16b*, *16c*, *18a*, *18b*, and *18c*, respectively. Each is connected through its drive shaft to a separate log feed roll. Six log feed rolls (not shown) are provided for the debarker and are positioned in a conventional manner in two sets. The first comprises the three infeed rolls and the second set is the three outfeed rolls, each arranged in triangular relationship about the axis of log feed into the debarker. The infeed and outfeed rolls are positioned on opposite sides of the log debarker frame which supports the rotating debarking tools in a conventional manner. Motors *10a*, *10b* and *10c* drive the infeed rolls and motors *11a*, *11b* and *11c* drive the corresponding outfeed rolls. As will become apparent, each of the hydraulic motors can operate at different and differing speeds to accommodate the uneven surfaces of logs.

To obtain the greater desired torque a larger motor than previously used is employed in the subject design. An example of such a motor is the MAE56016 TRW hydraulic motor which has a 49 cubic inch displacement per revolution. This motor develops a torque at its maximum allowable pressure of 1500 psi of 11,850 in-lbs. Although this motor has the combined volume of the MAE24002 and MAE34002 in cubic inches per revolution, it does not have the combined strength. Therefore, because of the potential increase in volume which is directly related to the subject torque and the intensified effects of the positive three-way flow divider (later discussed), a special hydraulic circuit design as shown in the drawing is used to protect each of the hydraulic motors at its respective input motor port. Additionally, as is apparent from the drawing, each infeed hydraulic motor is connected in series with its corresponding outfeed motor. The volume of oil consumed in this series arrangement requires that the downstream or outfeed motor in series must have an additional source of oil to prevent cavitation should its upstream or infeed motor stop rotating.

The hydraulic system accordingly functions as follows. The hydraulic oil is drawn from the tank 20 via a variable volume pressure compensated pump shown generally at 22 and then pumped through line 24 by a valve controlled gauge 26 and by a relief 28. The oil or fluid then flows through a directional valve 30 to a three way positive flow divider shown generally at 32. Three way positive flow divider 32 divides the flow of oil equally in each of its three legs 34*a*, 34*b*, 34*c*. Since the system in each of the three legs is identical only one of the legs will be described.

Figure 2:
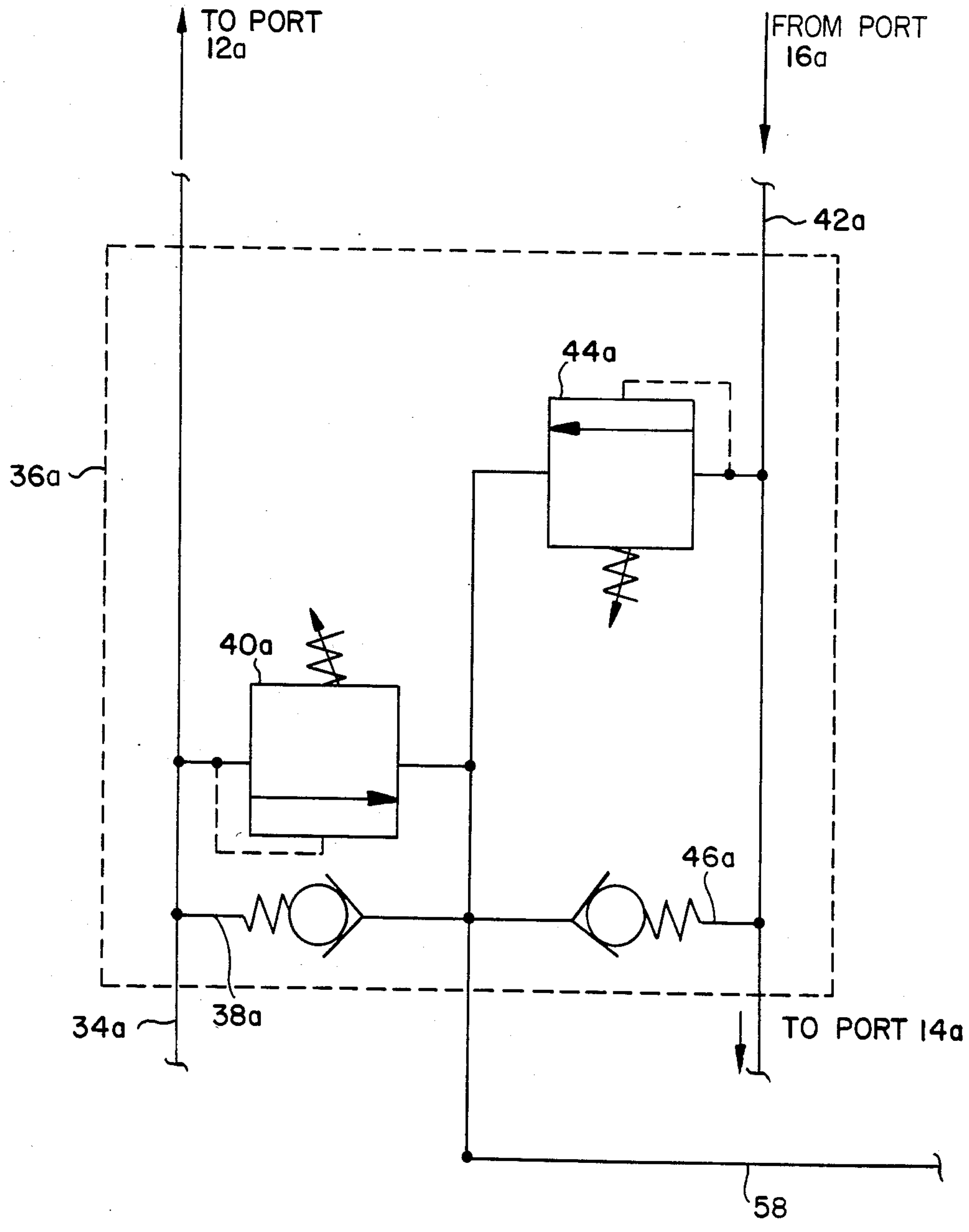
FIG. 2 is an enlarged view of one of the relief systems of the circuit of FIG. 1 illustrated in isolation.

Thus, one-third of the portion of the oil pumped by pump 22 flows through line or leg 34*a* through the relief system shown generally at 36*a* and best shown in FIG. 2 to motor 10*a* hence to motor 11*a*. More particularly it flows by the directional check valve 38*a* and on passed, or through, the relief 40*a*. Reliefs 40*a*, 40*b*, and 40*c* can comprise any suitable relief such as an adjustable, spring loaded, ball seating type cartridge that is "0" ring seated in a block. The oil then flows on through line 34*a* to hydraulic motor 10*a* through its port 12*a*. After causing motor 10*a* to rotate, the fluid flows out of hydraulic motor 10*a* through port 16*a*. The bulk of the oil passing through motor 10*a* will do work causing its drive shaft to turn and thus the associated roll (infeed roll) to rotate feeding the log through the debarker. However, each of these motors inherently has some cross port linkage that allows fluid to pass between the ports (12*a* and 16*a*) without doing work.

The oil then flows through line 42*a* through relief system 36*a* including past (or through) relief 44*a*. It then continues through line 42*a* by the directional check valve 46*a*, and on through line 42*a* to the outfeed motor port 14*a*. The oil then passes through the hydraulic motor 11*a* and out port 18*a* and through line 48*a* to the common return line 50 to tank 20.

When the pressure in line 24 from pump 22 exceeds a set pressure, the excess fluid is diverted through relief 28 and to a return oil filter 52 to tank 20. Also, when the fluid pressure differential exceeds that of filter 52, the check valve 54 is popped open and the excess fluid flows directly to tank 20. Further, the remaining fluid from motor 11*a* passes via line 48*a* to common return line 50, through directional valve 30 and then through the filter 52 or through springloaded check valve 54 to tank 20.

This system well handles shock load conditions. If, for example, motor 10*a* encounters a shock load sufficient to break relief 40*a* and attempts to dump too much of the oil supply back through the line 58 to tank 20, hydraulic motor 11*a* is still forced to continue to rotate due to the speed of the log passing through the debarker and the fact that the spiked surface of its roll grips the log with no slipping occurring between the log and the roll. Motor 11*a* would tend to cavitate if it were not for the present design. Hydraulic motor 11*a* will then, if needed, siphon oil (act as a pump) through directional check valve 46*a* which communicates with tank 20. This siphoning action occurs because hydraulic motor 11*a* is still rotating due to the log passing through the debarker and motor 11*a* requires additional fluid not supplied from motor 10*a* out of port 16*a* thereby siphoning oil from the tank through line 58.

When the above hypothesized shock load occurs, directional check valve 38*a* is sealed by the high pressure in line 34*a*. Because of the drop in pressure, directional check valve 46*a* opens supplying oil from line 58 to hydraulic motor 11*a*. Similarly, if hydraulic motor 11*a* encounters a shock load condition that is sufficient to break relief 44*a*, the pressure would also seat directional check valve 46*a*. The pre-set spring loaded check 56 is set to assist valve 30 to shift under pressure and oil flow.

Thus, the greater torque in these new motors eliminates some of the minor problems encountered with the smaller hydraulic motors. The greater volume of oil consumed by them however necessitates that a relief be installed inside of the motor or at the input port of the motor. The peak torque can and will be reached must faster. Therefore, the pressure control has to be located as close to the motor as possible as is accommodated by the present design. But because of the increased speeds required for this new operation in conjunction with the increased consumption of oil, the motors have been protected by moving the reliefs 36*a*, 36*b*, and 36*c* closer to them. The system is composed of three separate relief modules as opposed to the larger one common module used in the past and each can thus be moved closer to its respective motors. In other words, the relief is formed of three individual self-contained cells, each of which can be easily positioned anywhere on the hydraulic lines.

Motors 10*a*, 10*b*, 10*c*, 11*a*, 11*b*, 11*c* are further protected by the addition of the directional check valves which prevent the possible increased pressure created by motor 10*a* from passing on to motor 11*a* but at the same time will open when needed so that either motor that is volume restricted may siphon the needed oil through this open check valve from tank to prevent cavitation. The dual crossover relief with the directional flow controls on both and each supplied with a common return to tank provides a cross motor protection for both of the motors and allows the pressure to build across one motor without affecting the other. It allows the oil from a separate source to reach either motor should it be required to rotate without oil being supplied by its source. The dual crossover relief 36*a* with directional check valve controls does not allow excess pressure created by one motor to reach the other motor. The pressure intensification created by positive three way flow divider 32 could be very damaging if it were not for the present relief system which does not allow the excess intensified pressure to reach the motors.

From the foregoing detailed description, it will be evident that there are a number of changes, adaptations, and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. A log debarker drive system, including an infeed log roll and an outfeed log roll positioned for feeding logs through rotating debarking tools, the improvement comprising:

a first hydraulic motor connected to said infeed log roll for driving said infeed roll to move a log toward said debarking tools, a fluid supply, a first supply line connected to said first motor and said fluid supply, a second hydraulic motor connected to said outfeed log roll for driving said outfeed roll to move a log away from said debarking tools, a second supply line connected to said first motor and said second motor, whereby said first and second motors are connected in series, a third supply line connected to a secondary fluid supply, a valve connected between said second fluid supply line and said third fluid supply line, said valve opening to permit said second motor to siphon fluid from said secondary fluid supply through said third supply line when pressure in said second supply line drops below the pressure in said third supply line, and a pressure relief means for relieving pressure in said first supply line to said third supply line.

2. The system of claim 1 wherein said valve is a directional check valve that opens to permit said second motor to siphon fluid from said secondary fluid supply when said outfeed log roll is caused by the surface of a log to travel at a faster rate than said infeed log roll, thereby requiring said second hydraulic motor to turn faster than said first hydraulic motor.

3. The system of claim 1 wherein said valve is a directional check valve that opens to permit said second motor to siphon fluid from said secondary fluid supply when said pressure relief means is relieving pressure in said first fluid supply line.

4. The system of claim 1 wherein said valve is a directional check valve that opens to permit said second motor to siphon fluid from said secondary fluid supply when the fluid volume in said second fluid supply line is insufficient to meet the requirements of said second hydraulic motor necessitated by the rotation of said outfeed roll by a log pasing through the log debarker.

5. The system of claim 1 including a second pressure relief means for relieving pressure in said second supply line to said third supply line.

6. The system of claim 1 including a second valve connected between said first supply line and said third supply line, said valve opening to permit said first motor to siphon fluid from said secondary fluid supply through said third fluid supply line when pressure in said first fluid supply line drops below the pressure in said third supply line.

7. The system of claim 1 including three log infeed rolls and three log outfeed rolls.

8. The system of claim 7 including six hydraulic motors, each connected to a different one of said log infeed and log outfeed rolls, said six hydraulic motors defining three pairs of feed motors, each said pair including an infeed roll motor and an outfeed roll motor connected in series.

9. The system of claim 8 including a fluid pump connected to said hydraulic motors for pumping fluid to said six hydraulic motors.

10. The system of claim 8 including a three way positive flow divider connected to said pump for dividing the flow of fluid from said pump equally to each pair of feed motors.

* * * * *